United States Patent [19]
Chitnis et al.

[11] Patent Number: 5,681,450
[45] Date of Patent: Oct. 28, 1997

[54] REDUCED CHAOS CYCLONE SEPARATION

[76] Inventors: Girish K. Chitnis, 3745 Mayfield La., Chaddsford, Pa. 19317; Stephen J. McGovern, 3 Bedford Ter., Mantua, N.J. 08051; Klaus W. Schatz, 9 Jamieson Pl., Lawrenceville, N.J. 08648

[21] Appl. No.: 480,724

[22] Filed: Jun. 7, 1995

[51] Int. Cl.⁶ .......... C10G 11/00; C10G 49/22; C10G 9/36; F27B 15/09
[52] U.S. Cl. .......... 208/113; 208/72; 208/73; 208/95; 208/100; 208/126; 208/128; 208/161; 208/168; 422/147
[58] Field of Search .......... 208/113, 72, 73, 208/95, 100, 126, 128, 161, 168; 422/147

[56] References Cited

U.S. PATENT DOCUMENTS

| | | | |
|---|---|---|---|
| 3,565,968 | 2/1971 | Hicks, Jr. | 208/126 |
| 5,122,171 | 6/1992 | Kalen et al. | 55/349 |
| 5,171,423 | 12/1992 | Kruse | 208/113 |
| 5,178,648 | 1/1993 | Kalen et al. | 55/1 |
| 5,262,046 | 11/1993 | Buchanan et al. | 208/161 |
| 5,363,379 | 11/1994 | Eckenrode et al. | 371/3 |
| 5,372,707 | 12/1994 | Buchanan et al. | 208/113 |
| 5,464,528 | 11/1995 | Owen et al. | 208/113 |
| 5,514,271 | 5/1996 | Buchanan et al. | 208/113 |
| 5,538,696 | 7/1996 | Raterman et al. | 422/147 |

OTHER PUBLICATIONS

International Chemical Engineering, 8 Jan. 1993, "Unconventional cyclone separators".

*Primary Examiner*—Glenn A. Caldarola
*Assistant Examiner*—Patricia L. Hailey
*Attorney, Agent, or Firm*—Malcolm D. Keen; Robert B. Furr, Jr.

[57] ABSTRACT

A cyclone and process for fluidized catalytic cracking of heavy oils is disclosed. Gas and entrained solids are added around a clean gas outlet tube in a cyclone body. Solids and some gas are withdrawn via a solids outlet and discharged into a catch chamber. Some of the gas discharged with the solids into the catch chamber is returned to the interior of the cyclone body via an opening in the cyclone. Chaotic reflux of gas back into the cyclone via the solids outlet is eliminated. The device may be used as an FCC regenerator third stage separator or to improve other gas/solid separations.

21 Claims, 6 Drawing Sheets

REDUCED CHAOS CYCLONE SEPARATION

BACKGROUND OF THE INVENTION

1. Field of the Invention

The field of the invention is cyclone separators and fluidized catalytic cracking of heavy hydrocarbon feeds.

2. Description of Related Art

Cyclone separation is an old, and still not fully understood, unit operation. The general principles of cyclone operation are simple, and are briefly reviewed. It has long been known that differences in settling velocity can be used to separate solids from gas. Wheat can be separated from chaff when the wind blows, because the wheat falls rapidly while the chaff is carried away by the wind.

For simple separations, like wheat from chaff, the force of gravity alone achieves reasonably efficient separation. To recover fine particles from a gas stream, the force of gravity is not sufficient for efficient separation. Gravity settling still works, but a long residence time is needed to remove fine particles from gas so that large vessels would be needed to remove fine particles.

Cyclone separators replaced settling for fine particle separation. Centrifugal force, rather than gravity, separates particles from gas. A particulate laden gas stream is introduced into a cylindrical chamber. A spin is imposed on the gas, either by tangential addition or axial addition coupled with swirl vanes. Solids are thrown to the wall of the chamber by inertia, while a cleaner gas is withdrawn from a central region of the cyclone. Some gas exits with the solids. Solids may be discharged via a tangential outlet through a sidewall of the cyclone, or axially discharged.

There are many types of cyclone separators but they can be arbitrarily classified as open-bottom or closed-bottom. The present invention is especially useful at improving the operation of closed bottom cyclones, but both open and closed bottom cyclones are reviewed below to differentiate between the two.

Closed bottom cyclones have a generally cylindrical body which is essentially closed save for one or more feed inlets, having usually only one gas outlet and a solids outlet. Closed bottom cyclones are effectively isolated from the atmosphere of a vessel containing the cyclone. Closed bottom cyclones usually run at a slightly higher or slightly lower pressure than the atmosphere in the vessel around the cyclone. If pressure in the cyclone body is higher than the pressure outside the cyclone then the cyclone is a positive pressure cyclone. If pressure in the cyclone body is lower than the pressure outside the cyclone then the cyclone is a negative pressure cyclone.

In a closed bottom cyclone the feed gas is generally added tangentially to an end portion of the cyclone body. The gas outlet is usually a tube, axially aligned with the longitudinal axis of the cyclone body, passing through the same end of the cyclone receiving feed gas. The solids are usually withdrawn via an elongated dipleg at an end of the cyclone body opposing the gas outlet. In third stage separators, discussed below, the solids are sometimes withdrawn via a horizontal slit or slot in the wall of the cyclone body, and usually at an end opposite from the gas outlet.

Open bottom cyclones are different from closed bottom cyclones. An example of such a cyclone is the open bottom cyclone described in Helstrom U.S. Pat. No. 5,362,379. Another example of another type of "open" cyclone is the uniflow cyclone, shown in FIG. 20-111 of Perry's. Many third stage separators operate with an open bottom for discharge of solids and might be termed open bottom cyclones.

Somewhat related to the distinction between open and closed bottom cyclones is whether or not the cyclone dust outlet shares the same space (or vessel volume) as the gas inlet or is isolated.

When cyclones receive feed gas from, and discharge into, a fluid bed like the FCC regenerator, gas recycle is no problem. Gas discharged with solids through the diplegs recirculates up from the fluid bed to the cyclone inlet which is in the same space. Gas recycle from solids outlet to gas feed inlet is not a problem because the solids outlet and gas feed inlet share the same vapor volume in the reactor.

When the feed gas inlet is fluidly isolated from the solids outlet, this type of gas recycle is not possible. When solids discharge into a closed vessel such as the bottom of a third stage separator, gas discharged with solids through the dust outlet of the cyclone cannot return to the cyclone inlet. It was always assumed that because the dust catcher was essentially sealed that no more gas would escape via the solids outlet than would be removed with the solids phase removed from the dust catcher.

There are many other ways to differentiate between types of cyclones, e.g., vertical v. horizontal, small v. large, low efficiency or rough cut v. high efficiency, tangential v. axial entry and tangential v. axial dust outlet. While these provide useful ways of classifying different types of cyclones the distinction of open v. closed bottom cyclones, and the location of the dust outlet v. cyclone inlet, focusses on pressure and mass balance problems generally ignored by others and solved by the process and apparatus of the present invention.

This problem will be discussed in more detail later, but can be mentioned now as follows. In some types of cyclones, and in some cyclone placements, vapor recycle from the solids outlet to the feed gas inlet is not a significant problem. In open bottom cyclones, pressures are essentially in balance inside and outside the cyclone. Some gas always leaves with or is entrained or aspirated with departing solids flow. Such gas, beyond that which is eventually removed with the separated solids, easily returns into the open body of the cyclone. In closed or open bottom cyclones where the dust outlet shares the same vapor space as the cyclone feed gas inlet, gas recycle is never a problem. The problem appears in generally closed cyclones where gas discharged with solids from the device has no easy way back into the cyclone but the problem can appear to some extent even in open-bottom cyclones.

Before returning to the problem encountered by such returning gas, the general problems inherent in all cyclone separations, and the limits of our understanding as to how they work will be reviewed.

Cyclone separators have been used for more than a century, but not much is known as to the precise separation and flow mechanisms involved. Researchers know that high centrifugal forces and small cyclone diameters (which give the particles less distance to travel to reach a wall) improve separation and increase pressure drop.

Researchers know that flow in closed bottom cyclones is complex, generally involving a double spiral. The gas spirals down the outside and up the inside of the interior volume of the cyclone. If the gas spirals down in a clockwise direction gas flow reverses axial direction for the return trip, maintaining a clockwise spin. Superimposed on the double spiral flow may be a "double eddy", as reported in Perry's at 20-58.

There have been attempts to rigorously define closed bottom cyclone operation, but researchers have not been able to calculate a pressure drop, much less a collection efficiency using fundamental principles. Thus as stated in *Perry's Chemical Engineers Handbook*, Sixth Edition, Chapter 20 of which is incorporated by reference:

> "Although there have been several attempts to calculate the friction loss or pressure drop from fundamental considerations . . . none is very satisfactory . . . Consequently, no general correlation of cyclone pressure-drop data is available as yet." 20-84.

Much that goes on in cyclones is not obvious. It might be thought that polishing the surfaces might reduce pressure drop, but in fact the opposite happens. As reported in Perry's, pressure drop through cyclones decreases when the walls of the cyclone are roughened.

High cyclone velocities are known to increase centrifugal forces and intuitively this should lead to better separation. In practice higher velocities may decrease separation efficiency, especially when deflocculation occurs.

The state of the art on collection efficiency is aptly summarized in Perry's:

> "Collection Efficiency
>
> Despite numerous efforts to produce a theoretical prediction of cyclone performance, no fundamental relationship has yet appeared and received general acceptance."

Not only have workers in this area had trouble describing in detail how cyclones work, they have difficulty calculating when particles of a given size can reliably be captured. Perry's reports that attempts to size cyclones to capture particles of a critical diameter have failed because ". . . as previously described, the flow pattern is more complex than is assumed, and no critical particle diameter really exists."

Thus cyclones have been around for generations, but no one knows how they work exactly. Many modifications which one would intuitively think would improve cyclone performance are detrimental. Perry's reports:

> "Generally cone-and disk baffles, helical guide vanes, etc. placed inside a cyclone will have a detrimental effect on performance. A few of these devices do have some merit, however, under special circumstances . . . A disk or cone baffle located beneath the duct may be beneficial if air in-leakage at the dust outlet cannot be avoided."

Although cyclone design is perplexing, cyclones are needed in many processes. Cyclones are absolutely essential for fluidized catalytic cracking (FCC) units, which circulate tons per minute of fine particles. FCC is the largest consumer of solid catalyst and the largest fluid bed process in the United States and is reviewed below.

Catalytic cracking is the backbone of many refineries. It converts heavy feeds into lighter products by cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

In FCC catalyst having a particle size and color resembling beach sand circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits coke on the catalyst, thereby deactivating it. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. Modern fluid catalytic cracking (FCC) units use zeolite catalysts. Zeolite-containing catalysts work best when coke on the catalyst after regeneration is less than 0.1 wt %, and preferably less than 0.05 wt %.

To regenerate FCC catalyst to this low residual carbon level and to burn CO completely to $CO_2$ within the regenerator (to conserve heat and reduce air pollution) many FCC operators add a CO combustion promoter. U.S. Pat. No. 4,072,600 and 4,093,535, incorporated by reference, teach use of combustion-promoting metals such as Pt, Pd, Ir, Rh, Os, Ru and Re in cracking catalysts in concentrations of 0.01 to 50 ppm, based on total catalyst inventory.

Most FCC's units are all riser cracking units. This is more selective than dense bed cracking. Refiners maximize riser cracking benefits by going to shorter residence times and higher temperatures. The higher temperatures cause some thermal cracking, which if allowed to continue would eventually convert all the feed to coke and dry gas. Shorter reactor residence times in theory would reduce thermal cracking, but the higher temperatures associated with modern units create the conditions needed to crack thermally the feed. We believe that refiners, in maximizing catalytic conversion of feed and minimizing thermal cracking of feed, resort to conditions which achieve the desired results in the reactor and cause other problems which could lead to unplanned shutdowns.

Emergency shutdowns cause substantial economic losses. Modern FCC units must run at high throughput, and for years between shutdowns, to be profitable. Much of the output of the FCC is needed in downstream processing units. Most of the refiner's gasoline pool is usually derived from the FCC unit. It is important that the unit operate reliably for years, and accommodate a variety of feeds, including heavy feeds.

One failure mode in FCC is erosion of the cyclone caused by years of operation with high velocity, catalyst fines laden gas passing through the cyclones. Refiners do not like to use high internal cyclone velocities, but are driven to them because of the need to improve cyclone efficiency.

The FCC unit must operate without exceeding local emission limits on particulates. The catalyst is somewhat expensive, and most units have over a hundred tons of catalyst in inventory. FCC units circulate tons of catalyst per minute. Large circulation rates are needed because feed rates are large and for every ton of oil cracked roughly 5 tons of catalyst are needed.

These large amounts of catalyst must be removed from cracked products lest the heavy hydrocarbon products be contaminated with catalyst fines. Even with several stages of cyclone separation some catalyst fines invariably remain with the cracked products. These concentrate in the heaviest product fractions, usually in the Syntower (or main FCC fractionator) bottoms, sometimes called the slurry oil because so much catalyst is present. Refiners may let this material sit in a tank to allow some entrained catalyst to drop out, producing CSO or clarified slurry oil.

The problems are as severe or even worse in the regenerator. In addition to the large amounts of catalyst circulation needed to satisfy the demands of the cracking reactor, there is an additional internal catalyst circulation that must be dealt with. In most bubbling bed catalyst regenerators, an amount of catalyst equal to the entire catalyst inventory will pass through the regenerator cyclones every 15–30 minutes. Most units have several hundred tons of catalyst inventory. Any catalyst not recovered using the regenerator cyclones, typically comprising two stages of cyclones, will remain with the regenerator flue gas, unless a third stage separator, electrostatic precipitator or some sort of removal stage is added at considerable cost.

Many refiners use a power recovery system. The energy in FCC regenerator flue gas drives the air blower supplying air to the regenerator. The amount and particle size of fines in most FCC flue gas streams exiting the regenerator is enough to erode turbine blades if a power recovery system is installed. Generally a third stage separator (TSS) unit is installed upstream of the turbine to reduce the catalyst loading and protect the turbine blades. Some refiners even now install electrostatic precipitators or some other particulate removal stage downstream of third stage separators and turbines to further reduce fines emissions.

Many refiners now use high efficiency third stage cyclones to decrease loss of FCC catalyst fines and/or protect power recovery turbine blades. However, current and future legislation will probably require another removal stage downstream of the third stage cyclones unless significant improvements in efficiency can be achieved.

It should be mentioned that whenever a third stage separator is used to clean up regenerator flue gas a fourth stage separator is typically used to process the underflow (solids rich portion) discharged from the third stage separator. Gas volumes in the fourth stage separator are small because third stage cyclone designs minimize the amount of gas discharged with the solids. Typically 0.5 to 3% of the flue gas is removed with the solids discharged from the third stage separator. Third stage separators limit gas discharged with solids (gas in the underflow) to that needed to fluidize and discharge solids from the third stage separator.

For these reasons, small size particles and relatively low gas volumes, the fourth stage separator generally comprises small diameter cyclones, a hot sintered metal or ceramic filter, or a bag house.

Most refiners are satisfied with their primary and secondary cyclones or equivalent means for recovering catalyst from flue gas and discharging recovered catalyst back into the regenerator. The troublesome separation is downstream of the regenerator in the third stage separator or TSS unit. The TSS must produce gas with essentially no particles greater than 10 microns (when power recovery turbines are used) and/or achieve sufficient removal of fines to meet emissions particulates regulatory limits.

Modern, high efficiency third stage separators typically have 50 to 100 or more small diameter cyclones. One type of third stage separator is described in "Improved hot-gas expanders for cat cracker flue gas" Hydrocarbon Processing, March 1976. The device is fairly large, a 26' diameter vessel. Catalyst laden flue gas passes through many swirl tubes. Catalyst is thrown against the tube walls by centrifugal force. Clean gas is withdrawn up via a central gas outlet tube while solids are discharged through two blowdown slots in the base of an outer tube. The device removed most 10 micron and larger particles. The unit processed about 550,000 lbs./hour of flue gas containing 300 lbs/hour of particles ranging from sub-micron fines to 60 micron sized catalyst particles. This corresponds to an inlet loading of about 680 mg/NM^3.

The solids loading on various cyclones in various parts of the FCC process varies greatly. The third stage separator has the most difficult separation in terms of particle size, while the primary separators typically do 99% of the solids recovery. This can be put into perspective by considering what happens in an exemplary FCC unit.

In this exemplary unit the separation progresses as shown below, going from the primary and secondary cyclones making the initial separation of catalyst from flue gas in the regenerator through the TSS as final separation for the gas stream. The separated dust from the TSS is withdrawn to the fourth stage. Gas from the fourth stages merges with that of the third stage. Total emissions are 0.0474 tons/hr, corresponding to a loading of 215 mg/Nm^3.

|  | CYCLONE STAGE | | | |
| --- | --- | --- | --- | --- |
|  | 1st | 2nd | 3rd | 4th |
| Cyclone Inlet | | | | |
| Tons/hr solid | 500 | 5.0 | 0.15 | 0.108 |
| Average particle size, microns | 65 | 40 | 13 | 17 |
| Tons/hr gas | 275 | 275 | 275 | 8 |
| weight gas/weight solids | 0.55 | 55 | 1833 | 74 |
| Cyclone Gas Outlet | | | | |
| Tons/hr solid | 5.0 | 0.15 | 0.042 | 0.0054 |
| Average particle size, microns | 40 | 13 | 1.5 | 5 |
| Tons/hr gas | 275 | 275 | 267 | 8 |
| % gas via gas outlet | 100 | 100 | 97 | 100 |
| % solids removal/stage | 99 | 97 | 72 | 95 |
| Cyclone Solids Outlet | | | | |
| Tons/hr solid | 495 | 4.85 | 0.108 | 0.1026 |
| Average particle size, microns | 65 | 41 | 17 | 18 |
| Tons/hr gas | ~0 | ~0 | 8 | ~0 |
| % gas via solids outlet | ~0 | ~0 | 3 | ~0 |
| weight gas/weight solids | ~0 | ~0 | 74 | ~0 |

The total solids throughput per cyclone is expressed as tons per hour. The average particle size of the solids feed to each cyclone changes markedly. Larger particles are preferentially removed so each downstream stage, through the third stage, sees less solids with a much smaller particle size distribution.

The first stage or primary cyclones do most of the work, generally recovering more than 99% of the total solids in a single stage. The first stage cyclones also have the easiest job, in that the particles are relatively large, around 60–80 microns, there are large amounts of gas available to generate centrifugal forces, and the discharge of significant amounts of flue gas down the cyclone dipleg has no adverse consequences. The solids loading is high.

The secondary FCC regenerator cyclones treat as much gas as the primary cyclones, but orders of magnitude less solids. Secondary cyclones recover typically around 95–98% of the solids charged to them. The secondary cyclones can recover additional amounts of particulates from gas discharged from the primary cyclones. This is because lower solids loadings in the secondary cyclones permit higher gas velocities to be used in secondary cyclones than in primary cyclones. Higher gas velocities develop higher centrifugal forces to improve efficiency.

Third stage separator cyclone operation is characterized by large volumes of gas and small amounts of extremely fine particulates, much of it smaller than 5 microns.

Each downstream stage, from the first stage through the third stage, sees less solids and smaller particles. The discussion above focussed primarily on the gas stream to and the gas stream from the cyclone, and said little about gas discharged with solids at each stage. Focussing on gas flowing with solids at each stage presents a different picture of cyclone operation.

The first stage cyclone removes large amounts of solids using large amounts of gas to generate centrifugal forces. Some gas is discharged with the solids, as gas is needed to maintain fluidization of the recovered solids. This gas is not troublesome, as it can simply recycle through the bed of catalyst in the regenerator and return into the inlet horn of the first stage or primary cyclone without adverse effect.

The second stage cyclone has the same amount of gas flow, but orders of magnitude less solids. Small amounts of solids are discharged from the second stage cyclone diplegs, with small amounts of gas. As is the case in the first stage, this gas causes no problems, it simply reenters the FCC regenerator atmosphere. This gas becomes a small part of the gas feed to the first stage cyclone.

Because primary and secondary cyclones are so efficient, essentially all of the easy to remove particles are removed after two stages of cyclone separation. Only fines, irregularly shaped fragments of FCC catalyst, remain in the gas to the third stage separator.

Much more gas per unit weight of solids is discharged via the solids outlet in third stage separators as compared to cyclones in the regenerator. On a weight basis, more than 10 g of gas are discharged per 1 g of fines discharged to the catch chamber of TSS cyclones. Contrast this with operation in first and second stage cyclones in the FCC regenerator, where 1 g of gas transports over 1000 g of FCC catalyst down a dipleg. It can truly be said that from 10,000 to 100,000 times as much gas is present in third stage separator solids discharge stream as compared to solids discharge via the dipleg of a primary cyclone.

In part because of the relatively small amounts of solids involved, and large gas volumes, typically 5 orders of magnitude more gas relative to solids, many TSS cyclones are open-bottom.

After the gas leaves the gas outlet of the third stage separator, it has a sharply reduced solids content as compared to say the gas from the first stage cyclone. Although there is not much solids loading at this point, the amount of solids may be sufficient to destroy or damage power recovery turbines, and may exceed local existing or projected limits on particulates emissions, which at several localities are as low as 50 mg/Nm^3.

Refiners are at the limits of even high efficiency, small diameter cyclone technology at this point. Centrifugal forces are not sufficient to throw the smallest particles from the flowing gas stream to the wall before the flowing gas exits the cyclone. In the past, many refiners simply stopped here, and sent this flue gas to the atmosphere. Others used expensive electrostatic precipitators to meet emission limits.

These developments, and the fact that many refiners now have particulates emissions problems, are somewhat surprising in view of the many improvements which have occurred both in cyclone efficiency and catalyst properties. Cyclone efficiency has improved during the 50 years FCC has been in use in refineries. FCC catalysts are stronger and more attrition resistant.

These factors (better cyclones, stronger catalyst), if considered alone, would make FCC flue gas cleaner. Offsetting factors have included an increase in catalyst circulation rates, multiplying the load on the cyclones. Higher cyclone efficiencies are achieved by using higher velocities in the cyclones to generate stronger centrifugal forces. The high velocities attrit even modern attrition resistant catalysts to produce more fines which are harder to recover and also tended to wear out the cyclones.

Cyclone designers have a dilemma something like that of ancient bridge builders. Whatever is done to solve the problem has an effect which makes the base problem worse. Putting more stones under a bridge for support reduces the area available for fluid flow, increasing the water's velocity under the bridge. High efficiency (and high velocity) cyclones increases fines recovery but the gas makes more turns in the cyclone body which increases catalyst attrition.

Particle recovery in conventional large diameter cyclones associated with the FCC regenerator had plateaud. Refiners resorted to third stage separators (TSS) with many small diameter cyclones to increase particulate removal from FCC flue gas.

Mechanically third stage separators are troublesome. Many third stage cyclones are needed to handle the large volumes encountered in FCC flue gas streams. Each cyclone is of small diameter and is mounted either vertically or horizontally. One cyclone manufacturer uses many small cyclones, 10 inches in diameter, to increase centrifugal forces and reduce radial distance to a wall where solids could collect.

Figure 2:
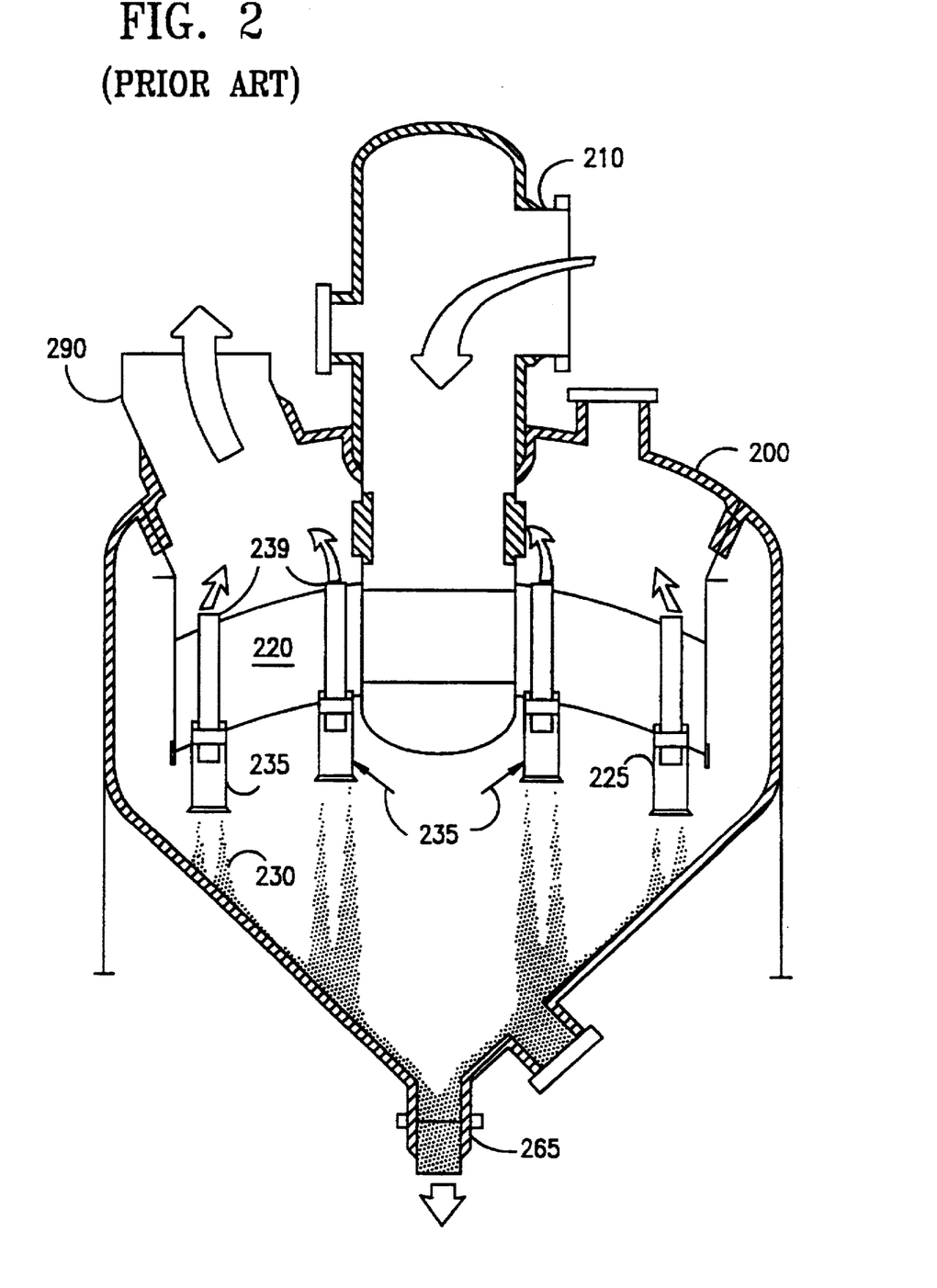
FIG. 2 (prior art) is a simplified schematic view of a third stage separator of the prior art with vertical cyclones.
Figure 3:
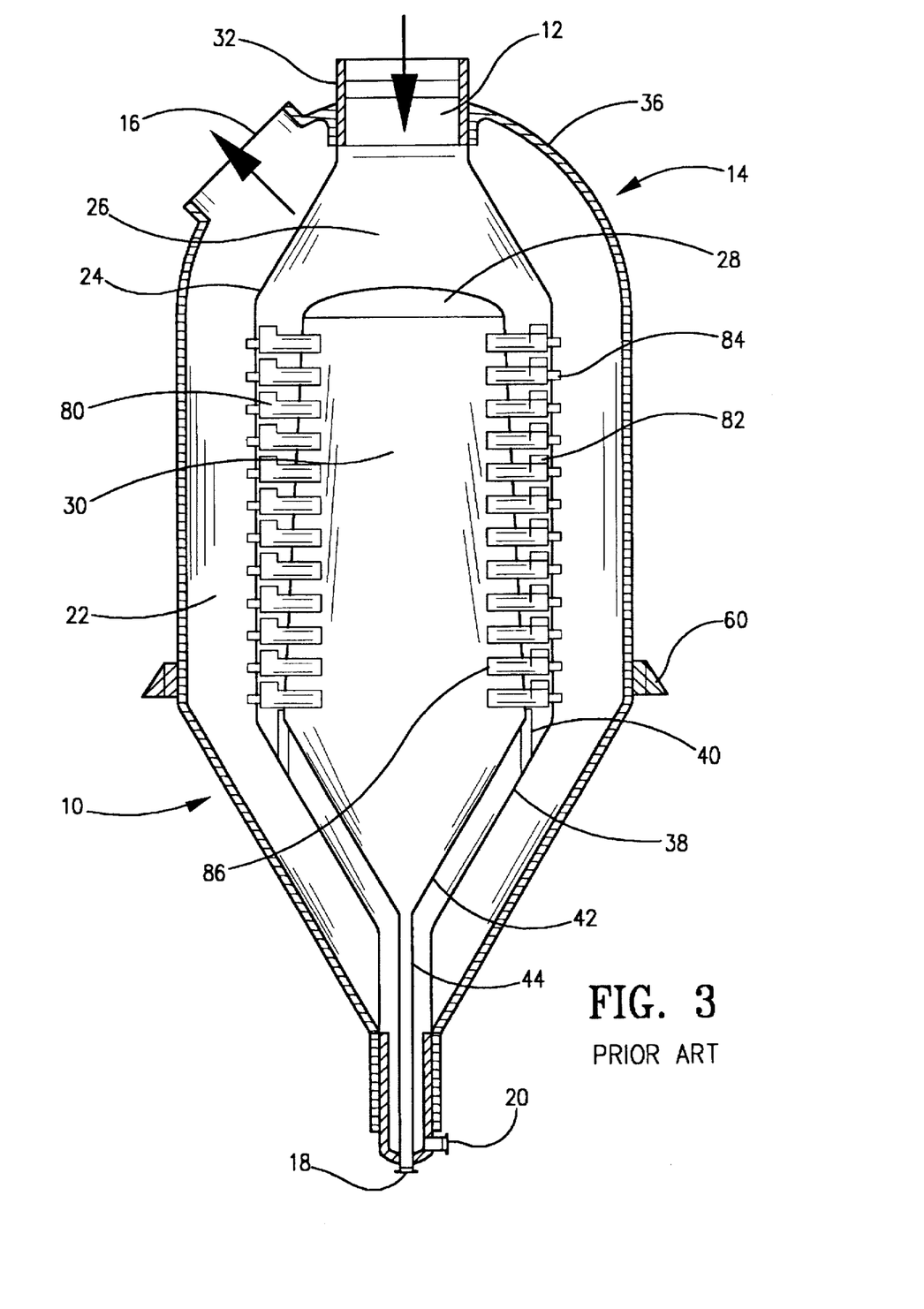
FIG. 3 (prior art) is a simplified schematic view of a third stage separator of the prior art with horizontal cyclones.

As many cyclones are needed it is generally necessary to install them in a single vessel, acting as a manifold. A typical third stage separator (TSS) with many horizontal cyclones is shown in FIG. 2. A typical TSS with many small cyclones in a vertical arrangement is shown in FIG. 3.

The TSS unit made it easier for particles to reach the wall of the cyclone by reducing the distance to the cyclone walls. The offsetting factor is some increase in pressure drop, and considerable capital expense for a unit which made only a modest improvement in fines removal.

TSS units did allow refiners to reach a new plateau of solids recovery, but known TSS units are not always adequate for refiners wanting to use power recovery turbines, or emit less particulates to the atmosphere.

It seemed for a while as if all advances that could be made in cyclone technology are finished. Refiners are at an impasse with existing cyclone technology in third stage separators.

We wanted to improve the operation of cyclones, especially their performance on the less than 5 micron particles, which are difficult to remove in conventional cyclones and difficult and costly to remove using electrostatic precipitation.

Although significant incremental solids removal is achieved using commercially available TSS units, we are not able to obtain the desired degree of particulate removal.

Some of our co-workers identified problems in existing TSS designs, and developed ways to overcome some of these problems. They made significant improvements by extending the barrel of the cyclone and providing a better solids outlet from the cyclone barrel. While better performance is achieved, there are still problems, primarily with excessive gas flow into the dust catch chamber and subsequent dust reentrainment.

We decided to re-engineer cyclones and focus on reducing dust reentrainment from TSS units. These cyclones have several constraints which we believed profoundly changed their operation. The smaller diameters used meant that multiple cyclones are almost invariably needed, which could introduce complications. Fortunately, the devices did not have to contend with large amounts of stripping gas, which greatly simplifies the design.

Multiple cyclones, in closely coupled operation, could, we believed, interact with each other in unpredictable ways. We decided to study a pair cyclones to learn more about the interactions of multiple cyclones. We used transparent cyclones so that rigorous data collection and theoretical analysis could be supplemented by direct visual observation.

Our efforts started with small diameter horizontal cyclones. We investigated the effects of various geometric and operational variables, such as cyclone diameter, inlet and gas outlet tube dimensions, barrel length, and inlet velocity and dust loading.

We knew higher gas velocities would increase centrifugal force and should increase dust recovery. We recognized that there would be penalties associated with higher pressure drop operation (increased power consumption, increased attrition on particulates, and increased wear on the cyclones), but wanted to explore this method of improving dust recovery.

Significant improvements were achieved by reducing the inlet area of our test cyclones by 50%. The same amount of gas flowed through a smaller cross section, and did so with greater velocity. There was a significant increase in pressure drop.

Reducing the inlet area beyond 60% did not improve dust collection efficiency but merely increased pressure drop. There is a point, reached in our experiments with 60% reduction in inlet area, where higher velocity operation increased the amount of solids exiting with the gas, i.e., reduced cyclone efficiency. We are not sure of the cause of the drop in efficiency, but could not discount the defloccu­lation effect reported in Perry's.

We next tried reducing the gas outlet tube diameter. This should also increase centrifugal forces. A reduction in outlet tube diameter from 90 mm to 75 mm had some beneficial effect, but not much.

We then extended the barrel of the cyclones and provided a longitudinal slot as described in our co-workers in their application Ser. No. 08/236,975, now U.S. Pat. No. 5,538, 696, incorporated by reference. We wanted to use tangential discharge of solids to improve efficiency and reduce the amount of gas leaving with the solids. Improvement was noted, but not as much as desired.

Third stage separation efficiency seemed to have peaked at relatively low levels. The conventional tricks tried with primary and secondary cyclones, such as increasing inlet or exit velocity, did not work with third stage separators. We speculated that there might be fundamental differences in the way TSS cyclones operate as compared to primary and secondary cyclones. We were also troubled by some puz­zling observations of significant and fluctuating flow of gas out of and into the longitudinal slot.

Although third stage cyclones are basically smaller ver­sions of cyclones used in the regenerator, there are funda­mental differences in the constraints imposed on each type of cyclone system. Cyclones used in the FCC process, whether in the regenerator side or the reactor side, can accommodate large amounts of gas flow with solids flow. The following section reviews this gas flow in primary and secondary cyclones and in third stage separators. Each separation process is reviewed, with emphasis on what happens to the gas removed with recovered solids or from external sources, such as stripping steam.

Reactor Cyclones

In the FCC reactor vessel a riser discharges cracked product vapor and spent catalyst. Primary cyclones separate most of the cracked product from the spent catalyst, but large amounts of product vapor remain with the recovered spent catalyst. The product vapors must be present to keep the recovered catalyst in a fluidized state as the spent catalyst passes down the primary cyclone diplegs. The product vapors are eventually removed from the catalyst in the stripping section which is generally in the same vessel containing the cyclone(s). Stripping vapor returns or refluxes into the cyclone via an opening on the inlet to the cyclone, or the gas outlet from the cyclone, or in some instances into an inlet associated with the cyclone itself.

There is a large volume of product entrained with or absorbed by the catalyst, as the catalyst:oil weight ratio is usually 3:1 to 6:1. There is a large volume of stripping steam used to displace or recover the product gas from the spent catalyst. The stripper vapor is a large stream which repre­sents a significant amount of product and a significant amount of gas traffic. Stripper vapor may pass through the primary cyclones used to generate the spent catalyst solids rich stream. There are two types of cyclone systems which operate in the FCC reactor environment. The two types in widespread use today are open and closed cyclones (in contrast to open-bottom and closed-bottom cyclones previ­ously discussed, which can be quite different).

In an "open" cyclone system the vessel receiving material discharged from a riser reactor is relatively open. Gas can have a 10 to 30 second or even longer residence time in this vessel. The riser reactor discharges into a large vessel containing a stripper in a lower portion of the vessel and cyclones in an upper portion. Gas recycle is relatively straightforward. Stripping steam and stripped cracked prod­uct gas all enter the inlet horn of primary cyclone(s).

In a "closed cyclone" system product gas is generally isolated from the reactor vessel and leave the vessel within a few seconds of residence time. The shortened gas resi­dence time greatly reduces undesired thermal cracking which would otherwise occur in the reactor vessel.

Gas recycle in a closed or relatively closed bottom cyclone system is more complicated than gas recycle in an open system. This is because the product gas is removed in a system which is "closed" to the reactor freeboard. The riser discharges into a cyclone, the gas outlet of which is closely coupled to or connected directly with a secondary cyclone. The gas exiting through the cyclone gas outlets is efficiently dealt with in such systems, but the gas discharged with the recovered solids phase also has to be removed. Most systems remove this gas, and accompanying stripping steam, via an annular opening around either the primary cyclone inlet or primary cyclone gas outlet transfer line to accommodate stripper vapor.

U.S. Pat. No. 5,362,379, which is incorporated by reference, disclosed use of an annular opening around the primary cyclone outlet to permit stripping vapor to flow from the reactor vessel into the primary cyclone. The stripping gas inlet to the cyclone is an annulus about the gas outlet. The device is an improvement over similar open bottom cyclones (Farnsworth's U.S. Pat. No. 4,478,708) where stripping gas flows up into the open bottom at the same time that separated catalyst exits the bottom of the chamber. The incoming gas entrains some separated catalyst and carries it back into the chamber, reducing cyclone efficiency.

In both closed and open bottom cyclone systems the gas streams involved are large. The gas feed to the cyclone is large, and the gas stream associated with gas from the stripper is large. There is always a minor amount of gas entrained with catalyst discharged from the cyclones. While this gas is essential to maintain the discharged solids in a fluidized state the amount of gas involved is so much less than the feed gas and stripping vapor streams that most designers ignore the gas associated with entrained solids.

Regenerator Cyclones

FCC regenerator cyclones usually are primary and secondary cyclones. Gas and entrained catalyst enter the inlet horns of the primary cyclones. Recovered catalyst is discharged down primary cyclone diplegs into the fluidized bed in the regenerator vessel. Fluidizing gas discharged from the diplegs with the recovered catalyst simply reemerges from the catalyst bed to reenter the inlet horn of the primary cyclone. The gas discharged from each primary cyclone usually is charged to the inlet of a coupled secondary cyclone, and again some fluidizing gas is discharged down the diplegs of the secondary cyclone into the catalyst bed within the regenerator vessel. This secondary cyclone dipleg gas stream also reemerges from the catalyst bed to reenter the inlet horn of the primary cyclones.

The cyclone dipleg gas, from both the primary and secondary cyclones, simply mixes with gas rising from the fluidized bed of regenerated catalyst and reenters the primary cyclone inlet horn. The gas streams discharged with the recovered solids streams are thus easily recycled via the large freeboard volume within the regenerator vessel.

Gas Recycle—TSS

Third stage separator cyclones are different from primary and secondary cyclones. The difference is not just gas/solids makeup, which is similar to the gas/solids feed to the secondary cyclones. Solids are generally discharged in a different way than occurs in primary cyclone, and handling of gas discharged with solids is strikingly different, though generally ignored.

TSS cyclones have generally not satisfactorily addressed the problem of how to deal with gas discharged with the solids. Relatively large amounts of gas are discharged with solids whether solids are discharged tangentially via a slot cut in a sidewall of the cyclone barrel or axially via an open bottom solids outlet opposite the clean gas outlet.

In some TSS cyclones there is no dipleg and no place for deaeration of solids. The solids are discharged at a relatively high velocity and may aspirate a significant amount of gas. Rather than gas fluidizing the solids the solids are carrying out excessive amounts of gas. At the solids outlet of TSS cyclones, the considerable kinetic energy in the solids carries gas from the cyclone body.

We wondered what happens to this gas. We were troubled by some puzzling observations and by results showing significant and fluctuating flow of gas out of and into the longitudinal slot of our test cyclones.

The system, especially when viewed in our paired cyclone test apparatus, seemed chaotic. Gas from one cyclone flowed into the catch chamber and then reentered the same cyclone as well as the second cyclone. Reducing length and width of the slot seemed to reduce the gas flow and the inter-action between the cyclones.

We realized the discharged catalyst always carried gas with it into the catch chamber where it had no place to go. Only a minor amount of this gas is needed for the underflow. Much larger amounts of gas exit the cyclone, and re-enter the cyclone in some way. We observed localized pulses of catalyst+gas discharge alternating with reverse flow of gas back into the barrel slot. This is the only way for gas discharged with the solids rich phase to return to the cyclones from the catch chamber, as there is not enough gas removed with the solids phase from the bottom of the device to mass balance the cyclones.

Tests with helium (He) tracer and two cyclones confirmed there is significant gas traffic from the interior of the cyclone out with the solids and back to the interior of the cyclone. This circulation had to occur via the solids outlet. In a multiple cyclone third stage separator we speculated that all cyclones discharge solids and gas, and some or all unintentionally recycle or reflux gas back through the solids outlet into the cyclone body. Refluxing gas entrains solids back into the inner vortex of the cyclone and out the gas outlet tube. We believed that multiple cyclones interact with each other to continuously and chaotically discharge and reentrain dust.

The problem stemmed from the way the gas returns into the cyclone body of the cyclone. Reverse flow, chaotic or randomly fluctuating in space and time, refluxes this gas via the solids outlet. This gas reflux flow is countercurrent to flow out of the solids discharge.

While such chaotic operation is most troublesome in a multiple cyclone installation it may occur in a single cyclone. Thus a single cyclone could alternate between a high solids discharge phase and a lower solids reflux phase. Another alternative would be for one end of an outlet slot to discharge solids while the other end of the slot permitted reflux back into the cyclone. In either case the effect of chaotic reflux via the solids outlet is to disrupt gas streamlines of the tangential flow within the cyclone body.

Rather than attack the symptoms of poor operation, we wanted to attack the disease. We wanted to bring order out of chaos to improve cyclone operation We discovered a simply and effective way to improve cyclone efficiency by providing a separate gas reentry means to the cyclone to reintroduce the refluxed gas. Gas refluxed in this way has little adverse effect on tangential velocity of the outer cyclone vortex, and might even increase it. It is in this outer vortex region where fines separation occurs.

We were able to stabilize the cyclone operation, and roughly halve the amount of fines discharged from the gas outlet tube, by providing a separate gas reflux means, preferably in the bottom of the cyclone body. We knew the device was highly effective, and moving large amounts of gas when we measured in one experiment 100 feet per second (fps) gas velocity exiting tangentially through the discharge slot and 170 fps through the reentry hole.

BRIEF SUMMARY OF THE INVENTION

The present invention provides a fluidized catalytic cracking process wherein a hydrocarbon feed is catalytically cracked by contact with a regenerated cracking catalyst in a cracking reactor to produce lighter products and spent catalyst, spent catalyst is regenerated in a catalyst regenerator having one or more separators for recovery of catalyst and fines from flue gas to produce regenerated catalyst which is recycled to said cracking reactor and regenerator flue gas containing catalyst fines, wherein an external separator in an external separator vessel removes at least a portion of said fines from said regenerator flue gas stream, said external separator vessel having a plurality of cyclones comprising a cyclone body having a length, a longitudinal axis, an inlet end and an outlet end; a flue gas inlet connective with said inlet end; a cylindrical gas outlet tube, having a longitudinal axis aligned with said longitudinal axis of said cyclone body, in said inlet end of said cyclone body for withdrawing gas with a reduced fines content; at least one solids outlet in said outlet end for discharge of fines and a minor amount of gas into a catch chamber in a lower portion of said external separator vessel and at least one gas reflux opening, fluidly isolated from said flue gas inlet at said inlet end of said cyclone body, for recycling at least a portion of said gas discharged with said solids via said solids outlet from said catch chamber back into said cyclone body.

In another embodiment, the present invention provides a cyclone separator comprising a closed-bottom cyclone body having a length and a longitudinal axis; a feed gas inlet at an inlet end of said cyclone body for a stream of gas and entrained solids; a gas outlet tube in said inlet end having a longitudinal axis aligned with said longitudinal axis of said cyclone body for withdrawing gas with a reduced entrained solids content; at least one solids outlet in a sidewall of said cyclone body for tangential discharge of solids and a minor amount of gas from said closed-bottom cyclone into a catch chamber, and at least one gas reflux opening fluidly isolated from said feed gas inlet for recycling gas from said catch chamber back into said cyclone body.

In another embodiment, the present invention provides a cyclone separator with a gas reflux means comprising a gas reflux tube passing through and sealingly affixed to a closed end of an at least partially cylindrical cyclone body having a length, a diameter and a longitudinal axis, said reflux tube having a diameter smaller than said diameter of said cyclone body, a reflux inlet outside said cyclone body, and a reflux exit inside said cyclone body, said cylindrical cyclone body having said sealed end as one end thereof and a gas outlet tube, sealingly affixed and passing through an opposing end of said cyclone body, said gas outlet tube having a diameter smaller than said diameter of said cyclone body and a longitudinal axis axially aligned with said cyclone body, and wherein said reflux exit is in a portion of said gas reflux tube which is axially aligned with said gas outlet tube, a tangential gas and solids inlet fluidly connective with said opposing end of said cyclone body end receiving gas and entrained solids, and a solids outlet discharging a concentrated solids stream with a minor portion of gas from said cyclone body via at least one opening in a sidewall of said cyclone body near said sealed end; and wherein said solids outlet and said gas reflux inlet are fluidly connected outside of said cyclone body.

In another embodiment, the present invention provides a multi-cyclone gas/solids separator comprising a plurality of cyclones, each comprising a cyclone body having a feed inlet end having at least one means for admitting gas and entrained solids into an annular space defined by a sidewall of said cyclone body and a cylindrical gas outlet tube axially aligned with said cyclone body; a solids outlet at an opposing end of said cyclone body having at least one tangential outlet for solids and a minor amount of gas through a sidewall of said cyclone body; and a gas reflux means comprising an opening axially aligned with said outlet tube, and wherein said plurality of cyclones share both a common catch chamber for solids discharged from said solids outlet, and a common manifold for gas and entrained solids.

DETAILED DESCRIPTION

Figure 1:
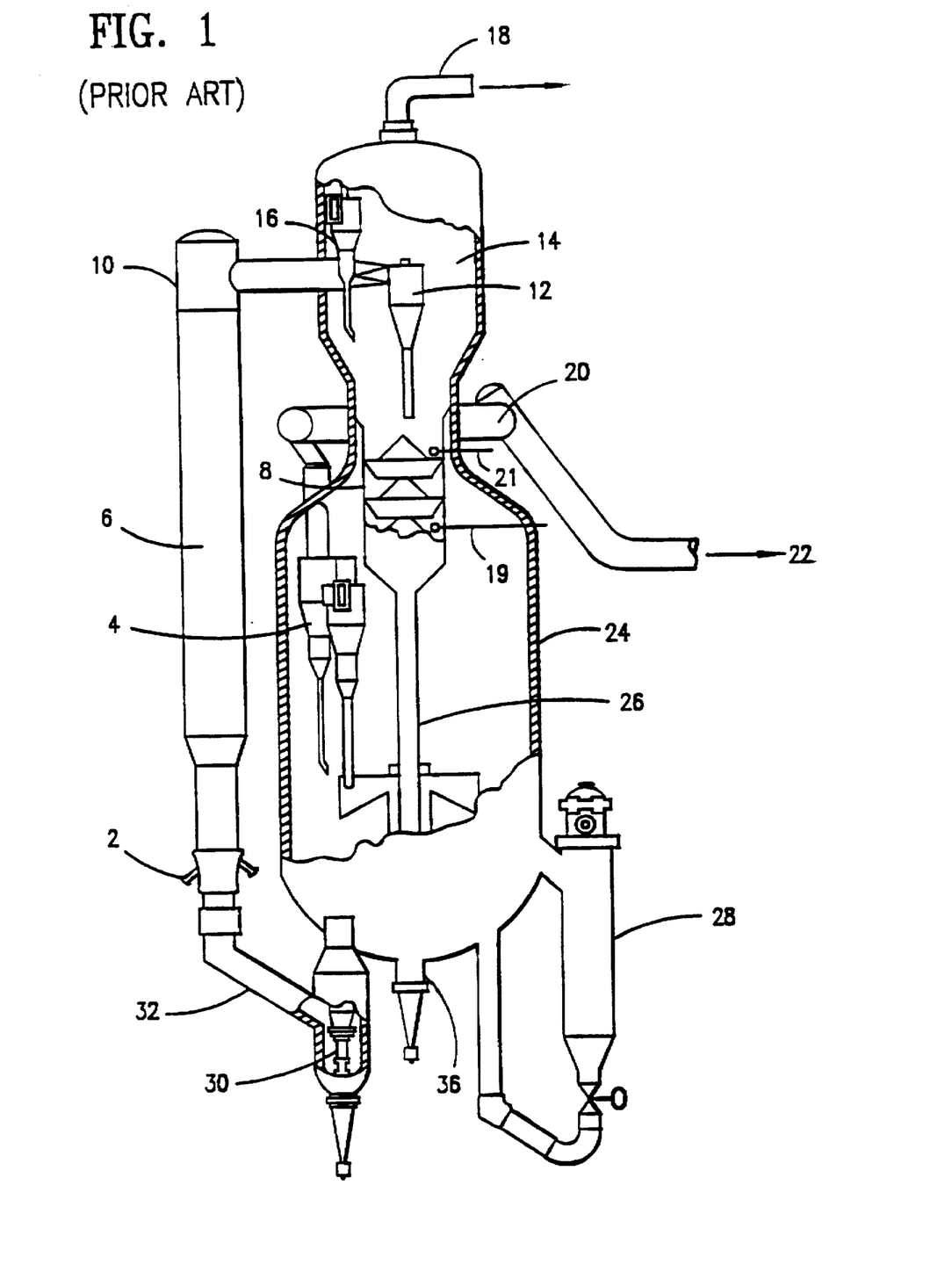
FIG. 1 (prior art) is a simplified schematic view of an FCC unit of the prior art.

The present invention can be better understood by reviewing it in conjunction with a conventional riser cracking FCC unit. FIG. 1 illustrates a fluid catalytic cracking system of the prior art, and is similar to the Kellogg Ultra Orthoflow converter Model F shown as FIG. 17 of Fluid Catalytic Cracking Report, in the Jan. 8, 1990 edition of *Oil & Gas Journal*. There are myriad other FCC units which can benefit from the process of the present invention, but the process of the present invention works well with this type of FCC unit.

A heavy feed such as a gas oil, vacuum gas oil is added to riser reactor 6 via feed injection nozzles 2. The cracking reaction is almost completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14 and eventually is removed via upper cyclones 16 and conduit 18 to the fractionator.

Spent catalyst is discharged down from a dipleg of riser cyclones 12 into catalyst stripper 8 where one, or preferably 2 or more, stages of steam stripping occur, with stripping steam admitted by means 19 and 21. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so heat may be removed from the regenerator if desired. Regenerated catalyst is withdrawn from the regenerator via regenerated catalyst plug valve assembly 30 and discharged via lateral 32 into the base of the riser reactor 6 to contact and crack fresh feed injected via injectors 2 as previously discussed. Flue gas, and some entrained catalyst, is discharged into a dilute phase region in the upper portion of regenerator 24. Entrained catalyst is separated from flue gas in multiple stages of cyclones 4 and discharged via outlets 38 into plenum 20 for discharge to the flue gas line via line 22.

The bubbling dense bed in such a regenerator exhibits excellent horizontal mixing, and the heat exchanger 28 allows full CO burn operation even with heavy feeds.

FIG. 1 does not show a third stage separator. Line 22 in most refineries would go to some type of third stage separator (not shown), usually one involving 50 to 100 (or more) small diameter horizontal or vertical cyclones. Purified flue gas would then pass through an optional power recovery turbine (not shown) then go to a stack for discharge to the atmosphere, optionally via a flue gas clean up device, such as an $SO_x$ scrubber, or the like, not shown.

FIG. 2 (Prior Art) is similar to FIG. 1 of Improved hot-gas expanders for cat cracker flue gas, Hydrocarbon Processing, March 1976, p. 141. This article is incorporated by reference.

Third stage separator 200 receives a fines containing FCC flue gas via inlet 210. Gas is distributed via plenum 220 to the inlets of a plurality of small diameter ceramic tubes 235 containing swirl vanes not shown. Fines collect on the walls of tubes 235 and are discharged from the base of the tubes as an annular stream of solids 230. A clean gas stream is withdrawn via outlet tubes 239 to be removed from the vessel via outlet 290. Solids are removed via solids outlet 265.

FIG. 3 (Prior Art) shows another type of commercially available TSS unit, with cyclones mounted horizontally. It is taken from FIG. 1 of Emtrol's U.S. Pat. No. 5,178,648, which is incorporated by reference. Separator 310 comprises gas inlet 312, housing 314, clean gas discharge outlet 316, a main solids outlet 318 and an auxiliary solids outlet 320.

The wall of housing 314 may be insulated, or a heat exchanger, not shown, may be used to cool the gas. The interior of housing 314 is divided into a clean gas chamber 322 bounded on the outside by housing 314 and on the interior by subhousing 324 which also forms the boundary of chamber 326. The interior of chamber 326 is defined by discharge chamber housing structure 328 concentrically enclosing a particle discharge chamber 330.

Subhousing 324 is supported centrally by refractory insulated member 332 which is supported by top cover 336. Discharge chamber 328 is supported from conical section 338 of subhousing 324 by cylindrical skirt 340. Adjacent skirt 340, the lower section of structure 328 may be formed as cone structure 342 joined at its apex to conduit 344 having at its lower end the main solids outlet 318. Housing 314 is supported by cleats 360.

Particulate laden gas enters the device and passes through the inlets 382 of a plurality of small diameter, horizontally mounted cyclones 380. Clean gas is discharged via outlet tube 384, while solids are discharged via orifice 386 into the particle discharge chamber 330 and descend for withdrawal via solids outlet 318. The cyclones 380 are connected laterally between the wall of subhousing 324 and the wall of structure 328.

In the device shown, solids collection is split between solids discharged via the solids outlets of the horizontal cyclones and some solids which naturally settle down around the cyclones and are removed via solids outlet 320. Most commercial devices have only a single solids withdrawal, with all solids discharged via outlets 386. Clean gas is removed from the device via gas outlet 316.

Figure 4:
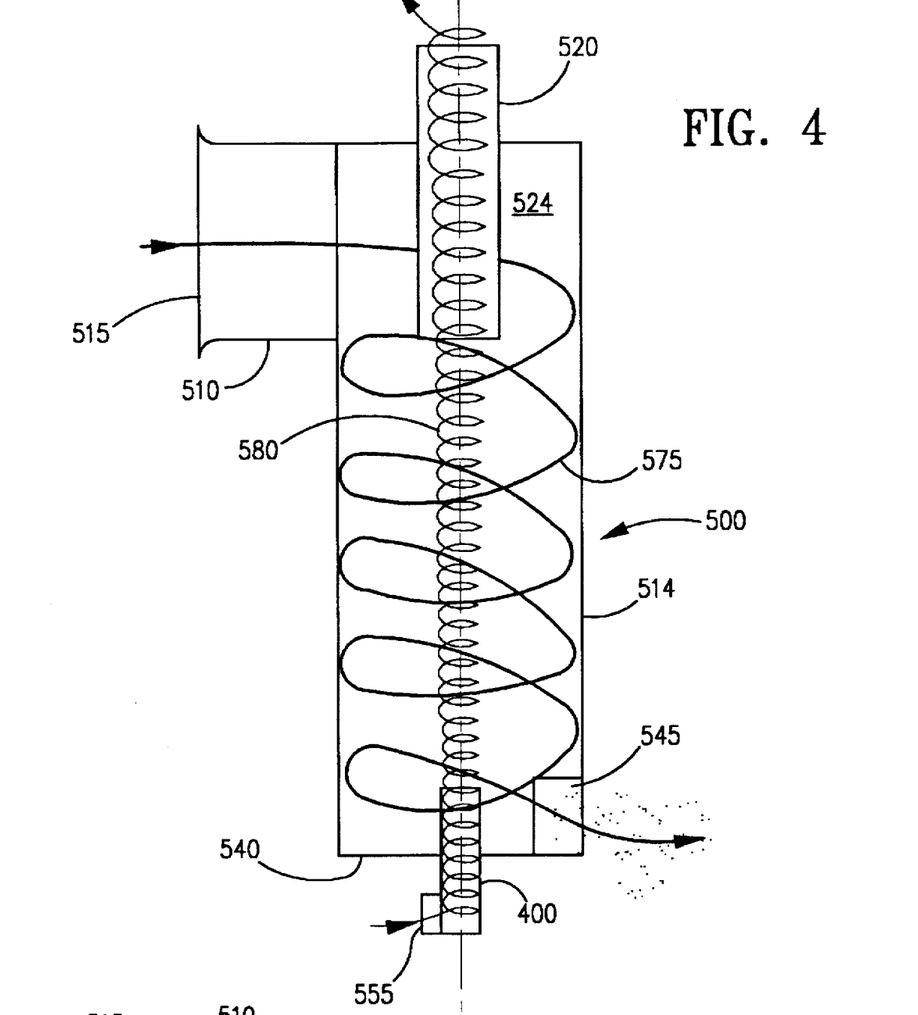
FIG. 4 (invention) is a simplified sectional view of a preferred cyclone with a gas reentry cyclone.
Figure 5:
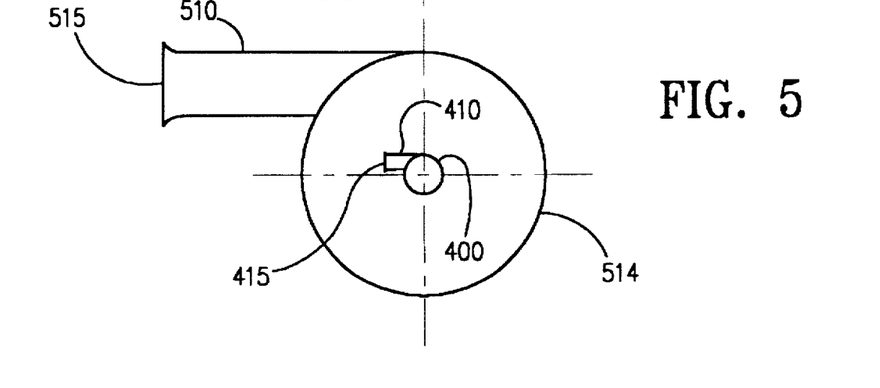
FIG. 5 (invention) is a bottom view of the FIG. 4 cyclone.

FIG. 4 shows a simplified sectional view of a preferred cyclone of the invention, while FIG. 5 shows a bottom view of the same cyclone. Like elements have like numerals.

Gas and entrained solids flow through tangential inlet duct 510 via inlet 515. Gas flow spirals around outlet tube 520 into region 524, where centrifugal force throws particulates to the wall 514 of the cyclone 500. Solids collect as a relatively thin, circulating layer of particles which are discharged through one or more tangential dust outlets 545. The cyclone has a closed bottom 540. Gas reentry is provided via a reentry cyclone 400 having a tangential inlet 410 and inlet opening 415.

The gross flow of gas through the device is in a classical double spiral. Gas spirals down the outside roughly as shown in spiral 575 and up the inside of the interior volume of the cyclone as spiral 580. If the gas spirals down in a clockwise direction then gas flow reverses axial direction for the return trip, maintaining a clockwise spin. The mini-cyclone, or gas reentry cyclone 400 is configured to impart a spin to the reentry gas which is in the same direction as that of the vortex 575 (outer spiral) and vortex 580 (inner spiral).

Figure 6:
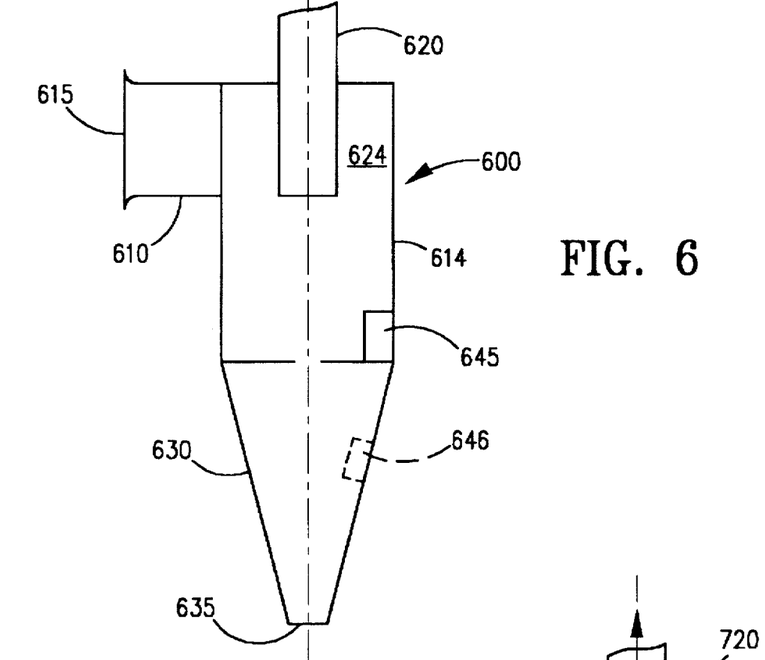
FIG. 6 (invention) a cyclone with a conical bottom and simple orifice hole for gas reentry.

FIG. 6 (invention) shows another embodiment which is simpler to fabricate and is self draining.

A feed gas is charged via opening 615 in tangential inlet 610 into region 624 of cyclone 600. Incoming gas flows around clean gas outlet tube 620, with dust collecting on the walls 614. Dust may be tangentially discharged via outlet 645, or the lower portion of the cyclone body may comprise a truncated cone 630 with perforations or tangential outlet 646. The gas reentry opening 635 will function as a means to reflux gas back into the cyclone from the dust catcher, and will also function as a drain during shutdowns.

Figure 7:
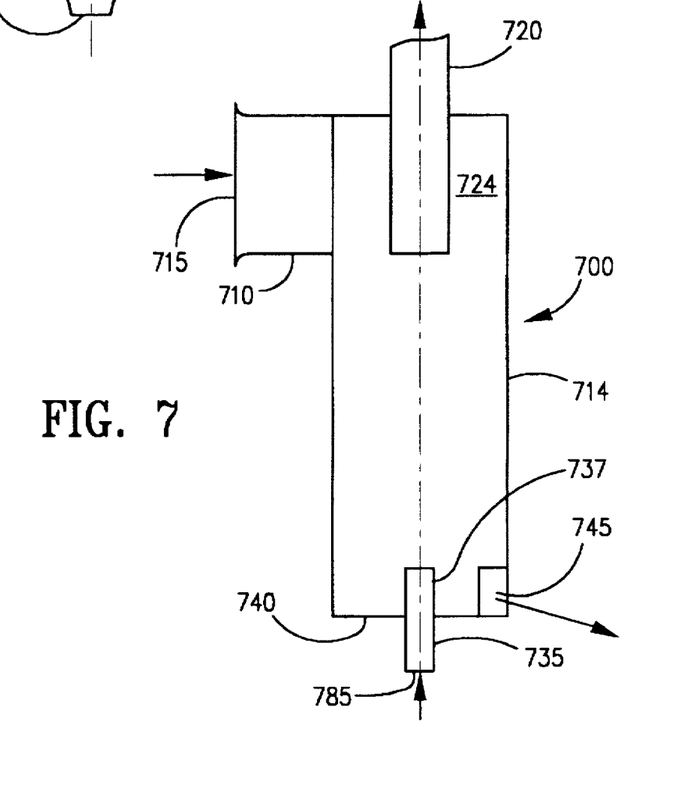
FIG. 7 (invention) shows a closed bottom cyclone with a flat bottom, tangential solids exit, and simply tube for gas reentry.

FIG. 7 (invention) shows another embodiment, a closed bottom cyclone 700 with a flat bottom and tangential exit.

Gas and dust are charged via inlet opening 715 in tangential inlet 710 to swirl around clean gas outlet tube 720. Dust collects on wall 714 and is discharged via outlet 745 into the dust catcher, not shown. Excess gas discharged with solids is returned to the interior of the cyclone via orifice 785 in tube 735. In the embodiment shown, the tube extends into the interior of the cyclone body via tubular extension 737. The bottom of the cyclone is closed by seal plate 740.

Figure 8:
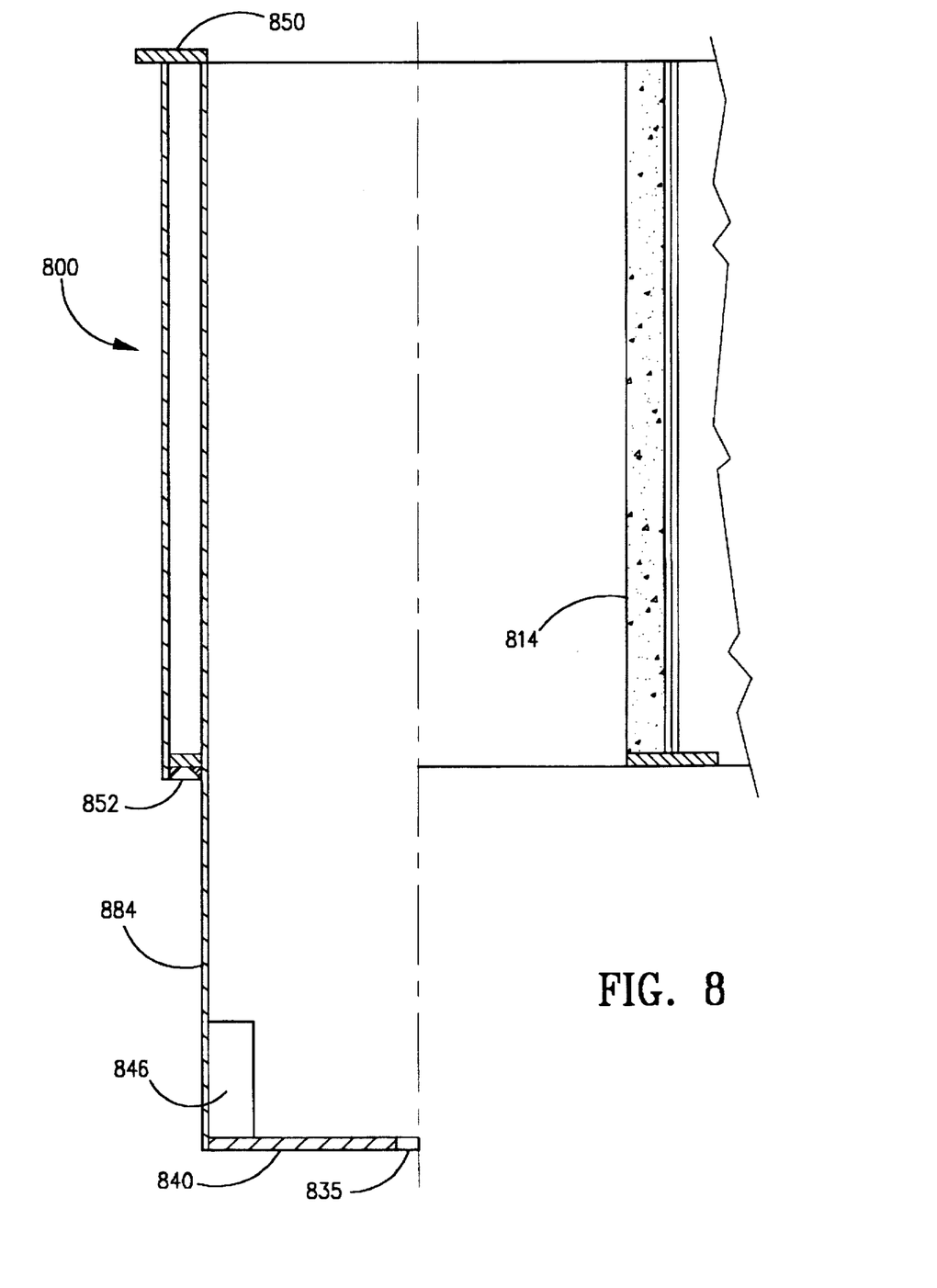
FIG. 8 shows details of split view of a prior art cyclone next to one of the invention.

FIG. 8 (invention/prior art) shows one way an existing cyclone (right half of the figure) may be modified to provide for gas reentry (left half of the figure).

The existing cyclone has an interior cylindrical wall 814 with a ceramic liner on 12" schedule 20S pipe. This was replaced with 10" Schedule 80S pipe, having a 10¾ OD., welded to retaining rings 850 and 852. The pipe extended down roughly an additional 50% as compared to the old design. The bottom of the cyclone was sealed with cylindrical plate 840, which had reentry hole 835 centrally located on plate 840. A tangential dust outlet 846 permitted dust and gas to be discharged into the catch chamber, not shown.

Having provided an overview of the FCC process and the new cyclone design, a more detailed review of the FCC process and of preferred cyclone separators follows.

FCC Feed

Any conventional FCC feed can be used. The feeds may range from typical petroleum distillates or residual stocks, either virgin or partially refined, to coal oils and shale oils. Preferred feeds are gas oil, vacuum gas oil, atmospheric resid, and vacuum resid. The invention is most useful with feeds having an initial boiling point above about 650° F.

FCC Catalyst

Any commercially available FCC catalyst may be used. The catalyst can be 100% amorphous, but preferably includes some zeolite in a porous refractory matrix such as silica-alumina, clay, or the like. The zeolite is usually 5–40 wt % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 wt % RE.

Relatively high silica zeolite containing catalysts are preferred for use in the present invention. They withstand the high temperatures usually associated with complete combustion of CO to $CO_2$ within the FCC regenerator.

The catalyst inventory may contain one or more additives, either as separate additive particles, or mixed in with each particle of the cracking catalyst. Additives can enhance octane (shape selective zeolites, typified by ZSM-5, and other materials having a similar crystal structure), absorb $SO_x$ (alumina), or remove Ni and V (Mg and Ca oxides).

Additives for $SO_x$ removal are available commercially, e.g., Katalistiks International, Inc.'s "DeSO$_x$." CO combustion additives are available from catalyst vendors. The catalyst composition, per se, forms no part of the present invention.

FCC Reactor Conditions

Conventional cracking conditions may be used. Preferred riser cracking reaction conditions include catalyst/oil weight ratios of 0.5:1 to 15:1 and preferably 3:1 to 8:1, and a catalyst contact time of 0.1–50 seconds, and preferably 0.5 to 5 seconds, and most preferably about 0.75 to 4 seconds, and riser top temperatures of 900° to about 1050° F.

It is best to use an atomizing feed mixing nozzle in the base of the riser reactor. Details of a preferred nozzle are disclosed in U.S. Pat. No. 5,289,976, which is incorporated by reference.

It is preferred, but not essential, to have a riser catalyst acceleration zone in the base of the riser.

It is preferred, but not essential, to have the riser reactor discharge into a closed cyclone system for rapid separation of cracked products from spent catalyst. A closed cyclone system is disclosed in U.S. Pat. No. 5,055,177 to Haddad et al.

It may be beneficial to use a hot catalyst stripper, heating spent catalyst by adding some hot, regenerated catalyst to spent catalyst. If hot stripping is used, a catalyst cooler may cool heated catalyst upstream of the catalyst regenerator. Suitable designs are shown in U.S. Pat. Nos. 3,821,103 and 4,820,404, Owen, which are incorporated by reference.

FCC reactor and stripper conditions may be conventional.

Catalyst Regeneration

The process and apparatus of the present invention can use conventional FCC regenerators. Most regenerators are either bubbling dense bed or high efficiency. The regenerator, per se, forms no part of the present invention.

Catalyst regeneration conditions include temperatures of 1200° to 1800° F., preferably 1300° to 1400° F., and full or partial CO combustion.

Third Stage Separator Vessel

Our cyclones are preferably used in a third stage separator removing catalyst and fines from regenerator flue gas. In many instances, existing equipment may be used by adding an extension to the prior art small diameter horizontal cyclones.

When used as a third stage separator in FCC there will be so little solids loading at this point in the FCC process so that refractory lining may not be needed.

Cyclone Design

Much of the cyclone design is conventional, such as sizing of the inlet, setting ratios of ID of the outlet tube to other dimensions, etc. Further details, and naming conventions, may be found in *Perry's Chemical Engineers' Handbook*, 6th Edition, Robert H. Perry and Don Green, which is incorporated by reference. The nomenclature discussion in Gas-Solids Separations, from 20–75 to 20–77, FIG. 20–106, 20–107 and 20–108 is referred to and incorporated by reference.

The gas reflux open area should be large enough to handle anticipated return gas flow, but should be no larger than the conventional solids outlet. In many instances, good results will be achieved with an open area equal to 1 to 10%, and preferably 1.5 to 5%, and most preferably 2 to 4% of the cross sectional area available for fluid flow through the conventional solids outlet.

Discussion

The new cyclone is easy to fabricate using conventional techniques and materials. The cyclone bottom can be conical to the outside or the inside of the cyclone. The reentry port may be a round hole but preferably is a small upside down cyclone.

The body of the cyclones may be fully or partially lined with concrete or other refractory lining, or may be unlined. The edges of outlets may be hard faced. A suitable refractory lining is Rescocast 2AA22S available from Resco Products, Inc.

The new cyclone may be used in revamps, especially of pre-existing TSS units with either multiple horizontal or multiple vertical cyclones. Our cyclone significantly improves removal of fines, that is, 0–5 micron particles. The new cyclone design will reduce erosion on power recovery turbine blades and substantially reduce particulate emissions.

In many FCC units the use of our cyclone in a third stage separator will eliminate the need for an electrostatic precipitator to reduce opacity and achieve particulate emissions of less than 50 mg/Nm3.

We claim:

1. A fluidized catalytic cracking process wherein a hydrocarbon feed is catalytically cracked by contact with a regenerated cracking catalyst in a cracking reactor to produce lighter products and spent catalyst, spent catalyst is regenerated in a catalyst regenerator having one or more separators for recovery of catalyst and fines from flue gas to produce regenerated catalyst which is recycled to said cracking reactor and regenerator flue gas containing catalyst fines, wherein an external separator in an external separator vessel removes at least a portion of said fines from said regenerator flue gas stream, said external separator vessel having a plurality of cyclones comprising:

a cyclone body having a length, a longitudinal axis, an inlet end and an outlet end;

a flue gas inlet connective with said inlet end;

a cylindrical gas outlet tube, having a longitudinal axis aligned with said longitudinal axis of said cyclone body, in said inlet end of said cyclone body for withdrawing gas with a reduced fines content;

at least one solids outlet in said outlet end for discharge of fines and a minor amount of gas into a catch chamber in a lower portion of said external separator vessel and at least one gas reflux opening, fluidly isolated from said flue gas inlet at said inlet end of said cyclone body, for recycling at least a portion of said gas discharged with said solids via said solids outlet from said catch chamber back into said cyclone body.

2. The process of claim 1 wherein at least a portion of said cyclone body is cylindrical.

3. The process of claim 1 wherein said cyclone body is cylindrical and has an opening in a sidewall for tangential discharge of fines and a minor amount of gas into said catch chamber.

4. The process of claim 1 wherein said gas outlet tube passes through one end of said cyclone body and said gas reflux opening is at an opposing end of said cyclone body.

5. The process of claim 4 wherein said gas reflux opening is a hole.

6. The process of claim 4 wherein said gas reflux opening is a cylindrical tube having a longitudinal axis aligned with said longitudinal axis of said cyclone body and passes through a sealed end of said cyclone body at an opposing end to said gas outlet.

7. The process of claim 6 wherein said gas reflux tube tangentially discharges gas reflux into said cyclone body.

8. The process of claim 1 wherein said feed gas inlet tangentially discharges gas into said cyclone body.

9. The process of claim 1 wherein said feed gas inlet axially discharges gas into said cyclone body.

10. The process of claim 1 wherein said gas reflux opening is a tube extending within said cyclone body from 0 to 1 cyclone body lengths and extending outside said cyclone body into said catch chamber from 0 to 1 cyclone body lengths.

11. The process of claim 10 wherein a swirl imparting means is fluidly associated with said gas reflux opening.

12. The process of claim 10 wherein said swirl imparting means comprises swirl vanes.

13. The process of claim 10 wherein said swirl imparting means comprises a tangential gas reflux entry into said gas reflux tube.

14. The process of claim 10 wherein said swirl imparting means comprises a tangential gas reflux exit from said gas reflux tube.

15. The process cyclone of claim 14 wherein tangential discharges of said gas reflux tube and said feed gas inlet both induce spin in the same direction within said cyclone body.

16. A cyclone separator comprising:

a closed-bottom cyclone body having a length and a longitudinal axis;

a feed gas inlet at an inlet end of said cyclone body for a stream of gas and entrained solids;

a gas outlet tube in said inlet end having a longitudinal axis aligned with said longitudinal axis of said cyclone body for withdrawing gas with a reduced entrained solids content;

at least one solids outlet in a sidewall of said cyclone body for tangential discharge of solids and a minor amount of gas from said closed-bottom cyclone into a catch chamber, and at least one gas reflux opening fluidly isolated from said feed gas inlet for recycling gas from said catch chamber back into said cyclone body.

17. The cyclone of claim 16 wherein said gas reflux opening is a tube extending within said cyclone body from 0 to 1 cyclone body lengths and extending outside said cyclone body into said catch chamber from 0 to 1 cyclone body lengths.

18. A cyclone separator with a gas reflux means comprising:

a gas reflux tube passing through and sealingly affixed to a closed end of an at least partially cylindrical cyclone body having a length, a diameter and a longitudinal axis, said reflux tube having:

a diameter smaller than said diameter of said cyclone body, a reflux inlet outside said cyclone body, and a reflux exit inside said cyclone body, said cylindrical cyclone body having:

said sealed end as one end thereof and a gas outlet tube, sealingly affixed and passing through an opposing end of said cyclone body, said gas outlet tube having a diameter smaller than said diameter of said cyclone body and a longitudinal axis axially aligned with said cyclone body, and wherein said reflux exit is in a portion of said gas reflux tube which is axially aligned with said gas outlet tube, a tangential gas and solids inlet fluidly connective with said opposing end of said cyclone body end receiving gas and entrained solids, and a solids outlet discharging a concentrated solids stream with a minor portion of gas from said cyclone body via at least one opening in a sidewall of said cyclone body near said sealed end; and wherein said solids outlet and said gas reflux inlet are fluidly connected outside of said cyclone body.

19. The cyclone of claim 18 wherein said reflux tube extends on either side of said cyclone body by a distance equal to 0 to 100% of the length of said cyclone body.

20. A multi-cyclone gas/solids separator comprising:

a plurality of cyclones, each comprising a cyclone body having:

a feed inlet end having at least one means for admitting gas and entrained solids into an annular space defined by a sidewall of said cyclone body and a cylindrical gas outlet tube axially aligned with said cyclone body;

a solids outlet at an opposing end of said cyclone body having at least one tangential outlet for solids and a minor amount of gas through a sidewall of said cyclone body; and a gas reflux means comprising an opening axially aligned with said outlet tube, and wherein said plurality of cyclones share both:

a common catch chamber for solids discharged from said solids outlet, and a common manifold for gas and entrained solids.

21. The separator of claim 20 wherein said gas reflux means has an interior portion within said cyclone body and an exterior portion extending into said catch chamber, and wherein said interior portion is a cylinder with imperforate sidewalls and open ends, and said exterior portion is a cylindrical tube sealed at the end extending into said catch chamber and having at least one tangential inlet or slot in a sidewall for recycle of gas from said catch chamber into the interior of said cyclone body.

* * * * *